United States Patent [19]

Ogden

[11] 4,371,486

[45] Feb. 1, 1983

[54] METHOD OF FILLING THE CAVITY OF A BUILDING BLOCK WITH AN AMINOPLAST RESIN FOAM INVOLVING REDUCED ADHESION OF THE RESIN TO THE FILLING APPARATUS

[75] Inventor: Dennis H. Ogden, Wolverhampton, England

[73] Assignee: British Industrial Plastics Limited, Manchester, England

[21] Appl. No.: 273,188

[22] Filed: Jun. 12, 1981

[30] Foreign Application Priority Data

Jun. 20, 1980 [GB] United Kingdom ................. 8020189

[51] Int. Cl.[3] ............................................. B29D 27/04

[52] U.S. Cl. ................................ 264/46.6; 52/309.12; 264/321; 264/DIG. 2

[58] Field of Search ................ 264/46.6, DIG. 2, 321; 52/309.12

[56] References Cited

U.S. PATENT DOCUMENTS 4,130,973 12/1978 Gustavsson .................. 264/DIG. 2

4,151,239 4/1979 Ogden .......................... 264/DIG. 2

FOREIGN PATENT DOCUMENTS 1563394 3/1980 United Kingdom .

*Primary Examiner*—Philip E. Anderson

*Attorney, Agent, or Firm*—Cushman, Darby & Cushman

[57] ABSTRACT

A method of filling a cavity in a building block with aminoplast resin foam comprises locating a template (6,7) against and in sealing relation to that face of the block having said cavity opening therefrom characterized in that an aperture (5) defined in said template and at least as large as the opening in the block which communicates with the cavity is aligned and registered with said opening, followed by passing curable aminoplast resin foam into the cavity under pressure to fill said cavity and form an upstand (9) of foam relative to the face of the block in the space defined by the thickness of the template, and then removing the template to leave at least some of said upstand projecting from said face.

6 Claims, 4 Drawing Figures

Figure 1A:
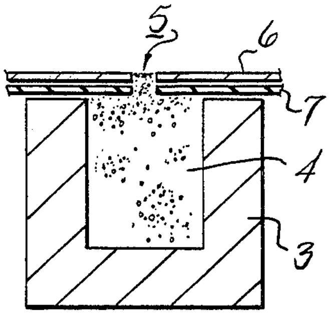

METHOD OF FILLING THE CAVITY OF A BUILDING BLOCK WITH AN AMINOPLAST RESIN FOAM INVOLVING REDUCED ADHESION OF THE RESIN TO THE FILLING APPARATUS

This invention relates to hollow or cellular building blocks of the kind having substantial blind cavities therethrough or therein. It was proposed at least as early as 1972 in a paper by W. T. Meyers (Procedings of 3rd SPI Conference on Cellular Plastics, pages 89–101) to enhance the thermal properties of such blocks by filling the cavities with plastic foam. One method of accomplishing this is described in UK Patent Specification No. 1563394. However, this method and others suffer from the problem that it is difficult to avoid some of the foam adhering to the filling apparatus being withdrawn with the latter after the filling operation, thereby producing a foam-free area in the cavity.

According to the present invention, a method of filling a cavity in a building block with aminoplast resin foam comprises locating a template against and in sealing relation to that face of the block having said cavity opening therefrom so that an aperture defined in said template and at least as large as the opening in the block which communicates with the cavity is aligned and registered with said opening, followed by passing curable aminoplast resin foam into the cavity under pressure to fill said cavity and form an upstand of foam relative to the face of the block in the space defined by the thickness of the template, and then removing the template to leave at least some of said upstand projecting from said face.

Hitherto, it has been common practice to pass the foam into the cavity through a relatively small diameter pipe, or through a relatively small aperture in a template. The latter is a feature of the Patent mentioned earlier. Both expedients might be expected to maximise the filling pressure and therefore, the extent to which the cavity is filled. In practice, however, this has not been successful because foam adhesion to the underside of the template.

In the case of the present invention the opening in the template is large enough to prevent much, if any, foam sticking to it when the template is lifted away from the block. Instead, an upstanding portion of foam is left standing proud of the block surface. Subsequent stacking of the blocks tends to crush this upstanding foam portion down into the cavity, thereby minimising the effect of drying shrinkage. This compression of the upstanding portion tends to augment the foam-retaining effect of allowing the foam to shrink against protrusions which may be created by incorporating recesses into the cavity walls, as is common practice in the industry.

Preferably, the template has a plurality of apertures corresponding to the cavities in at least one block to be filled with foam. However, one aperture may be used to fill more than one cavity at once. Preferably, cavities are filled in turn by traversing a foam delivery pipe in the form of a "shoe" over the free face of the template. More preferably the shoe is also used to "wipe" the free surface of the template, thereby defining the amount of foam in the upstanding portion. Further discussion of the shoe technique will be found in the patent referred to above.

In order that the invention be better understood, a preferred embodiment of it will now be described by way of example with reference to the accompanying drawings in which:

FIG. 1 is a sectional side elevation of a block filled by the method previously described in U.S. Pat. No. 1,563,394, and FIG. 2 is a sectional side view of a block filled by the method of this invention. The same reference numerals are used throughout.

IN FIG. 1A a block 3 has a blind cavity 4, filled with foam. The foam was introduced through a small aperture 5 in part of a template 6. A foam rubber layer 7 is placed between the block and the template to prevent leakage during filling. The filling step was carried out by traversing a foam generator output pipe in the form of a shoe across the free face of the template, (not shown), exactly as described in the aforesaid patent.

Figure 1B:
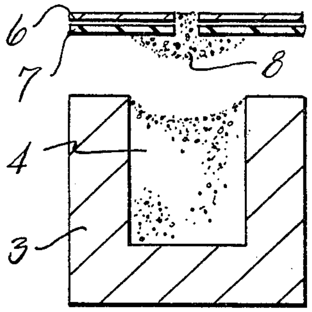

In FIG. 1B the template has been lifted off the block, taking with it a quantity of foam 8, leaving an incompletely filled cavity.

Figure 2A:
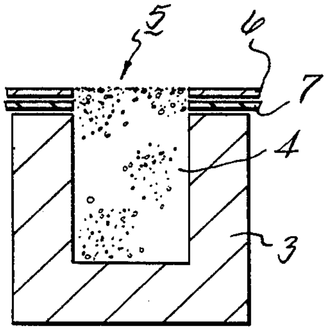
Figure 2B:
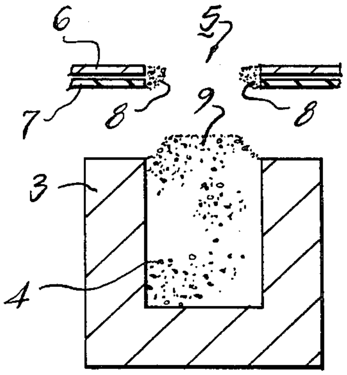

In FIG. 2A, the aperture 5 is as large as the opening in the block and is aligned with it. In FIG. 2B the template has been lifted off after completing the traversing operation, which also wipes the upper surface of the template free from foam. Because the area of contact is limited to the edges of the template only two very small portions 8 are lifted off, leaving an upstanding portion 9.

What we claim is:

1. A method of filling a cavity in a building block with aminoplast resin foam, the method comprising the steps of:

(1) locating a template against and in sealing relation to that face of the block having said cavity opening therefrom, so that an aperture defined in said template, whose dimensions are at least as large as the dimensions of the cavity opening in the block which communicates with the cavity, is aligned and registered with said opening, followed by (2) passing curable aminoplast resin foam into the cavity under pressure to fill said cavity and form an upstand of foam relative to the face of the block in the space defined by the thickness of the template, and then (3) removing the template to leave at least some of said foam upstand projecting from said face.

2. The method of claim 1 wherein the foam is supplied to the free face of the template by traversing a foam delivery pipe over said free face.

3. The method of claim 1 or claim 2 wherein each of a plurality of cavities in at least one block are filled in succession prior to removing the template.

4. A building block having a cavity therein filled with cured aminoplast resin foam by the method of claim 1 or 5.

5. A method of filling a cavity in a building block with aminoplast resin foam, the method comprising the steps of:

(1) locating a template against and in sealing relation to that face of the block having said cavity opening therefrom, so that an aperture defined in said template, whose dimensions are at least as large as the dimensions of the cavity opening in the block which communicates with the cavity, is aligned and registered with said opening, said aperture being large enough to prevent substantially all the foam from sticking to it when the template is lifted away from the block, followed by;

(2) passing curable aminoplast resin foam into the cavity under pressure to fill said cavity and form an upstand of foam relative to the face of the block in the space defined by the thickness of the template;

(3) removing the template to leave at least some of said foam upstand projecting from said face;

(4) allowing the foam to cure; and thereafter (5) crushing the upstand of cured foam into the foam in the cavity.

6. The method of claim 1 or 5 wherein the aperture defined in the template is as large as the opening in the block.

* * * * *